(12) United States Patent
Matsumoto

(10) Patent No.: US 11,971,331 B2
(45) Date of Patent: Apr. 30, 2024

(54) THREE-DIMENSIONAL DISPLAY DEVICE, THREE-DIMENSIONAL DISPLAY METHOD, AND PROGRAM

(71) Applicant: FUJIFILM Corporation, Tokyo (JP)

(72) Inventor: Kazuma Matsumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/937,253

(22) Filed: Sep. 30, 2022

(65) Prior Publication Data

US 2023/0028185 A1    Jan. 26, 2023

Related U.S. Application Data

(63) Continuation of application No. PCT/JP2021/012917, filed on Mar. 26, 2021.

(30) Foreign Application Priority Data

Apr. 1, 2020    (JP) .................................. 2020-065949

(51) Int. Cl.
*H04N 13/156* (2018.01)
*G01M 5/00* (2006.01)
(Continued)

(52) U.S. Cl.
CPC ........ *G01M 5/0033* (2013.01); *G01M 5/0075* (2013.01); *H04N 13/156* (2018.05);
(Continued)

(58) Field of Classification Search
CPC .......................... G01M 5/0033; G01M 5/0075; H04N 13/156; H04N 13/183; H04N 13/275;
(Continued)

(56) References Cited

U.S. PATENT DOCUMENTS

2009/0304259 A1* 12/2009 Yamamoto .............. H01L 22/20
382/145
2012/0141011 A1*  6/2012 Sakai ................. G01N 21/9501
382/149
(Continued)

FOREIGN PATENT DOCUMENTS

JP       2006-338312 A    12/2006
JP       2013-002390 A     1/2013
(Continued)

OTHER PUBLICATIONS

International Search Report issued in PCT/JP2021/012917; dated May 11, 2021.
(Continued)

*Primary Examiner* — Michael Lee
(74) *Attorney, Agent, or Firm* — Studebaker & Brackett PC

(57) ABSTRACT

Provided are a three-dimensional display device, a three-dimensional display method, and a program capable of notifying a user of an event having a causal relationship with a damage. The three-dimensional display device (10) includes a memory (16) that stores a three-dimensional model of a structure, a damage displayed in the three-dimensional model, and an event that has a causal relationship with the damage; a display unit (26); and a processor (20). In the three-dimensional display device (10), the processor (20) causes the display unit (26) to display the three-dimensional model, superimpose the damage on the three-dimensional model and display the damage, and display the event having the causal relationship with the damage.

14 Claims, 15 Drawing Sheets

(51) Int. Cl.
  *H04N 13/183* (2018.01)
  *H04N 13/275* (2018.01)
  *H04N 13/361* (2018.01)

(52) U.S. Cl.
  CPC ......... *H04N 13/183* (2018.05); *H04N 13/275* (2018.05); *H04N 13/361* (2018.05)

(58) Field of Classification Search
  CPC ........ H04N 13/361; G06F 3/14; G06Q 50/08; G06T 11/60
  See application file for complete search history.

(56) References Cited

U.S. PATENT DOCUMENTS

| | | | |
|---|---|---|---|
| 2013/0311111 | A1 | 11/2013 | Lewis et al. |
| 2018/0182090 | A1* | 6/2018 | Yamagishi ............... G06T 7/001 |
| 2018/0217024 | A1 | 8/2018 | Takamori et al. |
| 2018/0292328 | A1* | 10/2018 | Karube ................. G06T 7/0004 |
| 2018/0292329 | A1* | 10/2018 | Karube ................. G01N 21/88 |
| 2018/0300874 | A1* | 10/2018 | Karube ................. G06T 7/0004 |
| 2018/0357755 | A1* | 12/2018 | Seo ............................ G06T 7/62 |
| 2019/0137409 | A1* | 5/2019 | Nogami ............... G06T 1/0007 |
| 2019/0258394 | A1* | 8/2019 | Tateishi ................. G01N 21/84 |
| 2019/0355148 | A1* | 11/2019 | Horita .................... G03B 15/00 |
| 2020/0302595 | A1* | 9/2020 | Iwabuchi ............. G06T 3/4038 |
| 2021/0150692 | A1* | 5/2021 | Dickman ............ G06F 18/2148 |
| 2021/0272272 | A1* | 9/2021 | Matsumoto ............... G06T 7/50 |
| 2022/0406018 | A1* | 12/2022 | Kikuchi .................. G06T 19/00 |

FOREIGN PATENT DOCUMENTS

| | | |
|---|---|---|
| JP | 2013-239175 A | 11/2013 |
| JP | 2014-085730 A | 5/2014 |
| JP | 2015-138467 A | 7/2015 |
| JP | 2016-065809 A | 4/2016 |
| JP | 2016-211955 A | 12/2016 |
| JP | 6213792 B1 | 10/2017 |
| JP | 2018-185208 A | 11/2018 |
| JP | 2019-049951 A | 3/2019 |
| JP | 2019-057192 A | 4/2019 |
| WO | 2017/047315 A1 | 3/2017 |
| WO | 2017/217185 A1 | 12/2017 |

OTHER PUBLICATIONS

International Preliminary Report on Patentability issued in PCT/JP2021/012917; dated Sep. 29, 2022.

An Office Action; "Notice of Reasons for Refusal," mailed by the Japanese Patent Office on Feb. 21, 2024, which corresponds to Japanese Patent Application No. 2022-512126 and is related to U.S. Appl. No. 17/937,253; with English language translation.

* cited by examiner

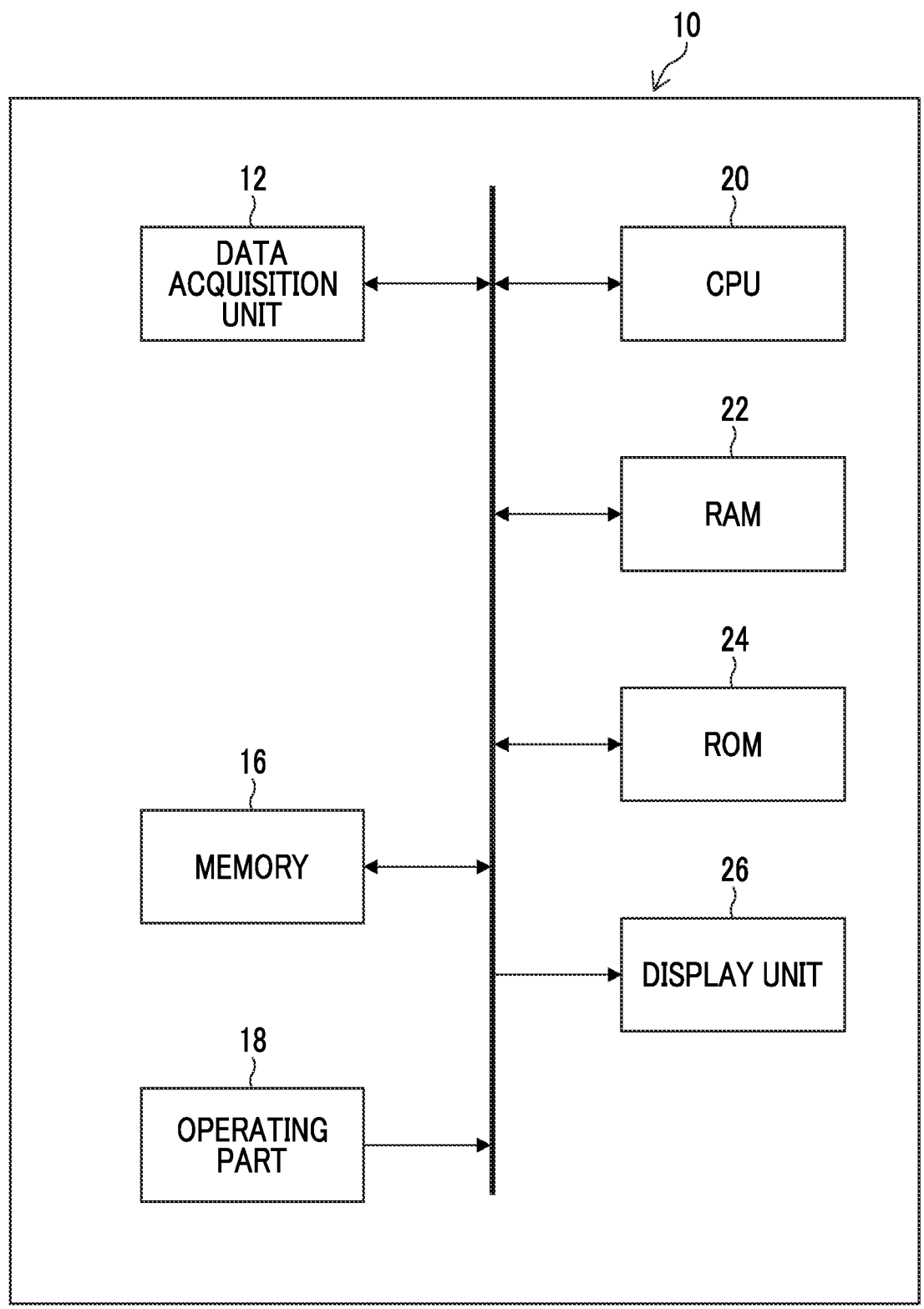

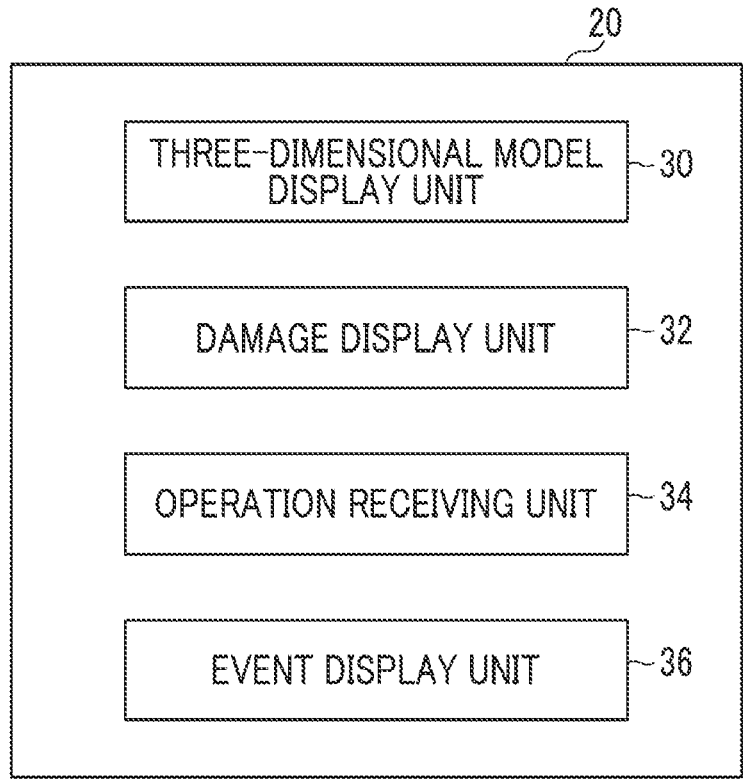
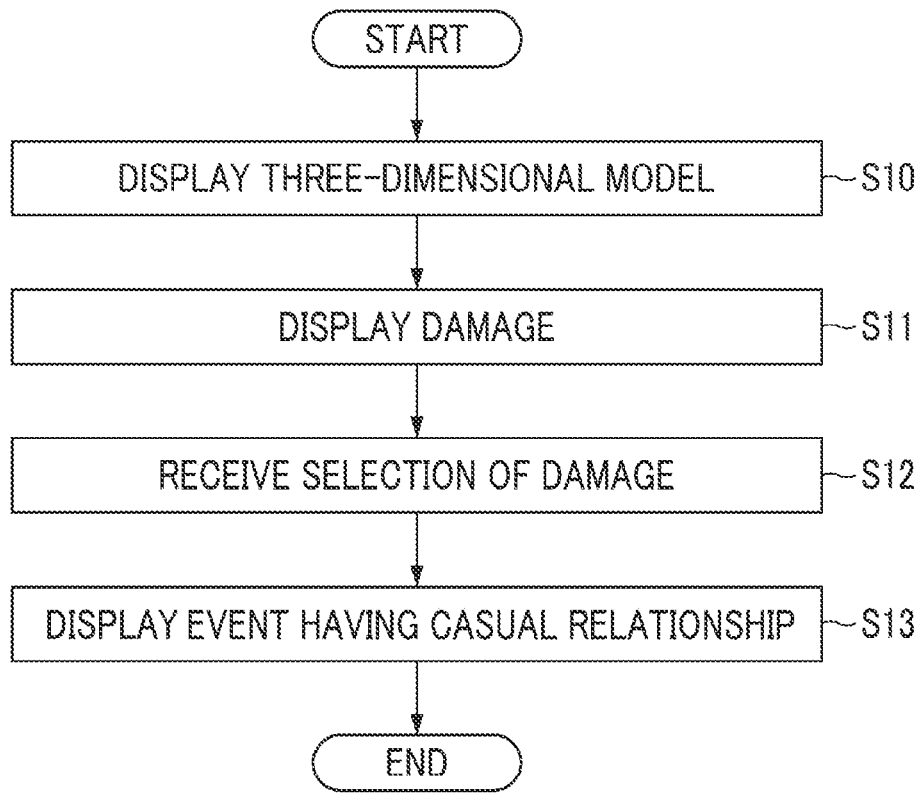

FIG. 4

| THREE-DIMENSIONAL MODEL | DAMAGE | EVENT 1 | EVENT 2 | ... |
|---|---|---|---|---|
| BRIDGE A | CRACK A (CAPTURED IMAGE) | CRACK Z (CAPTURED IMAGE) | TRAFFIC INFORMATION A | ... |
| | CRACK B | CRACK Y | — | ... |
| | CRACK C | CRACK X | — | ... |
| ..... | ..... | ..... | ..... | ..... |

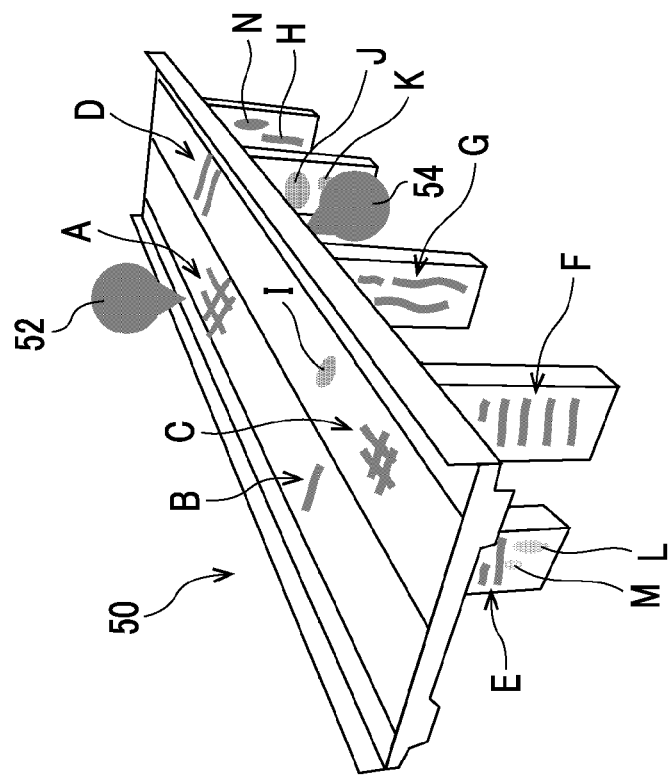
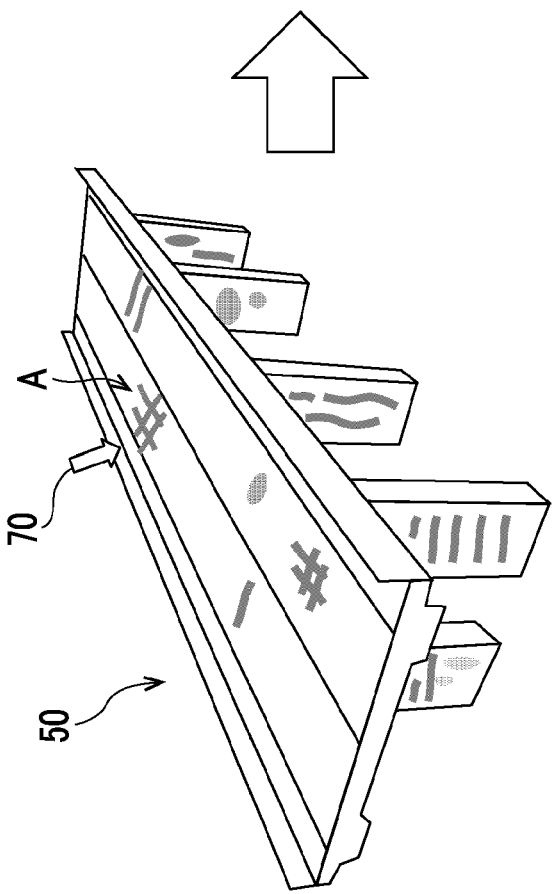
FIG. 6B
FIG. 6A

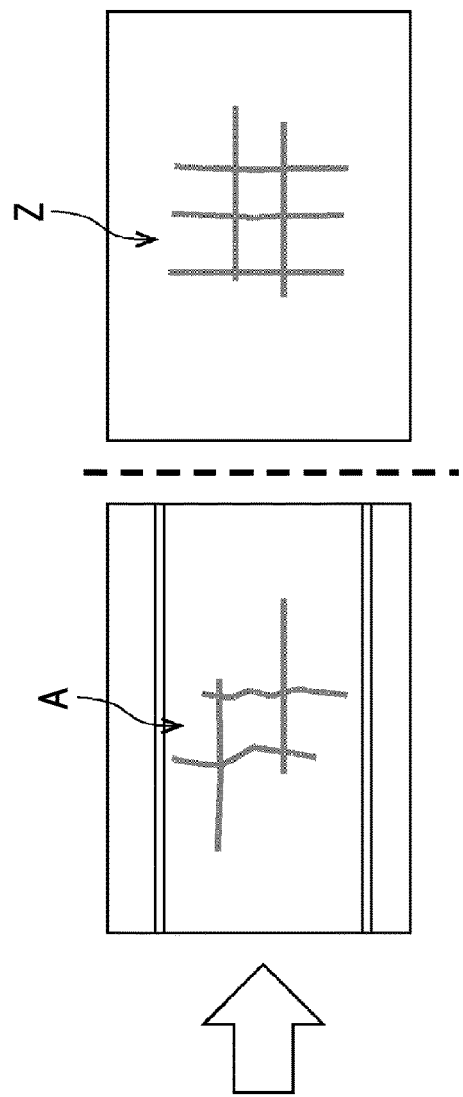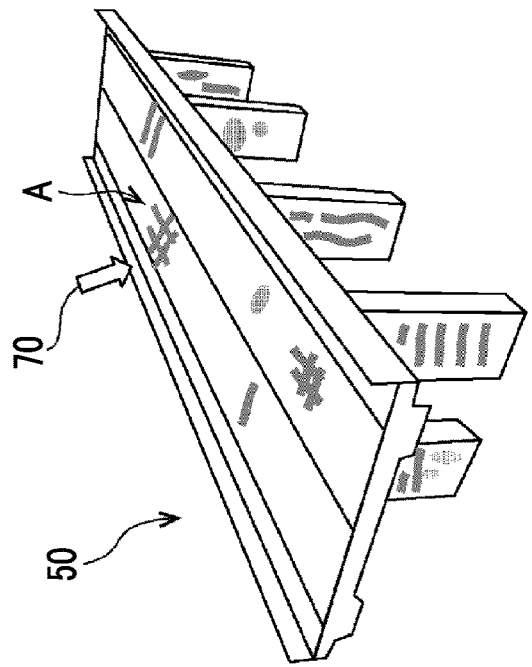
FIG. 7A
FIG. 7B

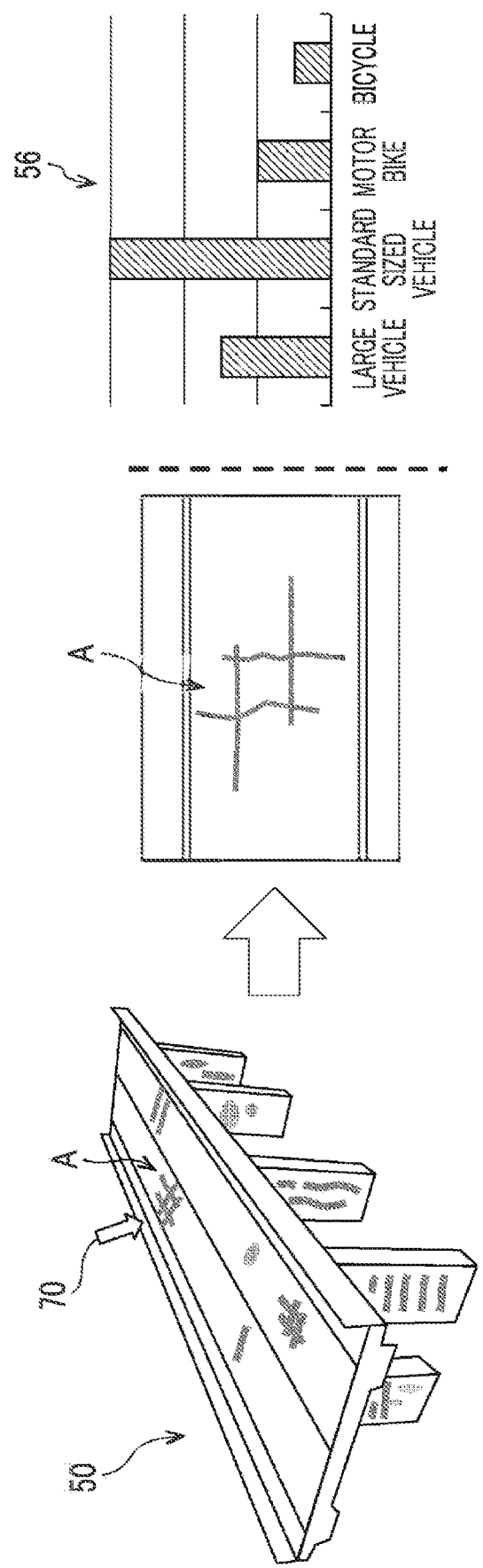

FIG. 10

| THREE-DIMENSIONAL MODEL | DAMAGE | EVENT | RANK |
|---|---|---|---|
| BRIDGE B | WATER LEAKAGE P | CRACK Q1 | LEVEL 1 |
| | | CRACK Q2 | LEVEL 3 |
| | | CRACK Q3 | LEVEL 7 |
| | | CRACK Q4 | LEVEL 10 |
| | | CRACK Q5 | LEVEL 10 |
| | CRACK O1 | — | — |
| | CRACK O2 | — | — |
| | CRACK Q6 | CRACK Q7 | LARGE |
| | | EARTHQUAKE INFORMATION A | MIDDLE |
| | | TEMPERATURE INFORMATION A | SMALL |
| ..... | ..... | ..... | ..... |

FIG. 14

| THREE-DIMENSIONAL MODEL | DAMAGE | EVENT 1 | EVENT 2 | DATE |
|---|---|---|---|---|
| BRIDGE C | CRACK A | TRAFFIC INFORMATION A | — | MAY 31, 2010 |
| | CRACK A | TRAFFIC INFORMATION A | CRACK B | MAY 31, 2015 |

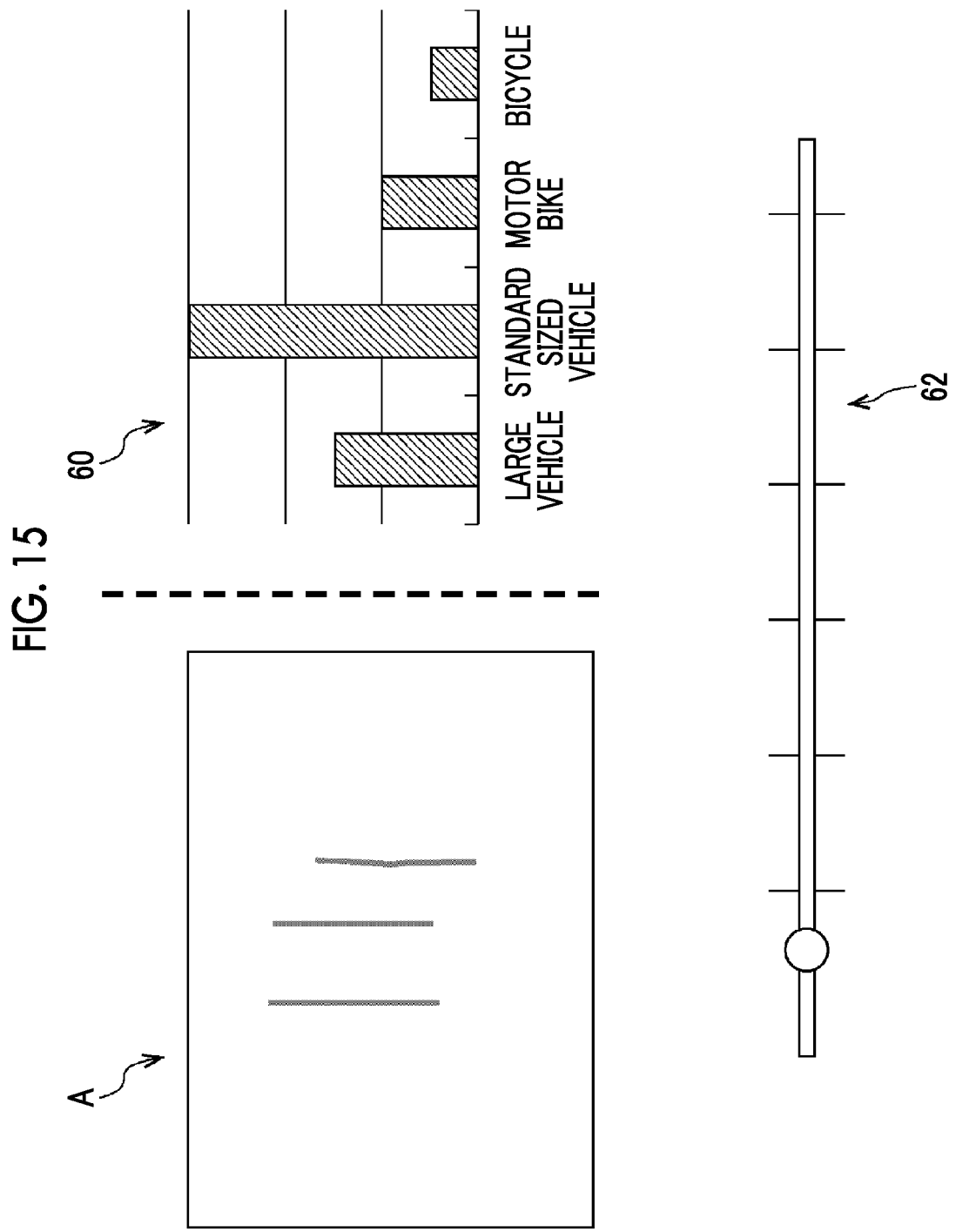

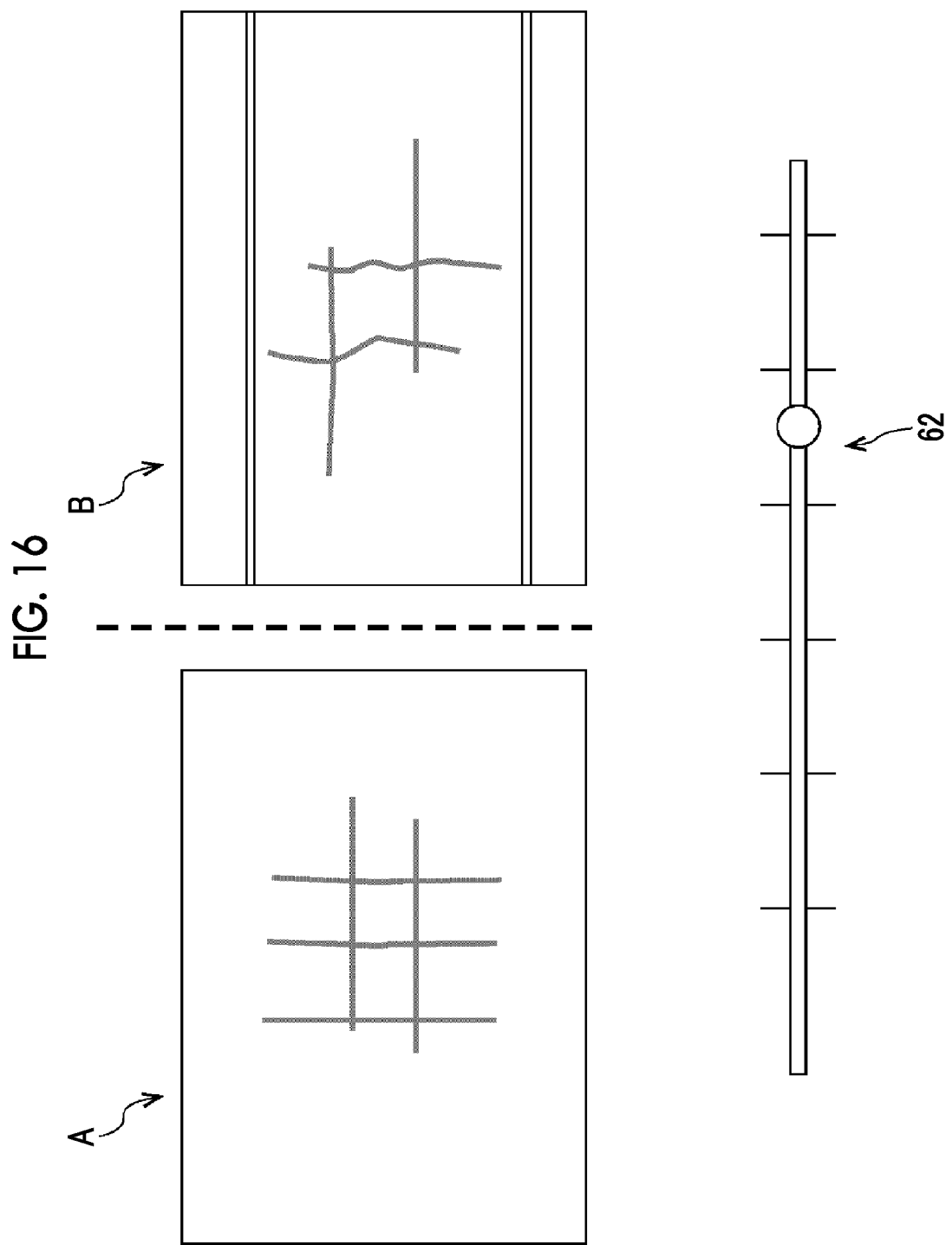

THREE-DIMENSIONAL DISPLAY DEVICE, THREE-DIMENSIONAL DISPLAY METHOD, AND PROGRAM

CROSS-REFERENCE TO RELATED APPLICATIONS

The present application is a Continuation of PCT International Application No. PCT/JP2021/012917 filed on Mar. 26, 2021 claiming priority under 35 U.S.C § 119(a) to Japanese Patent Application No. 2020-065949 filed on Apr. 1, 2020. Each of the above applications is hereby expressly incorporated by reference, in its entirety, into the present application.

BACKGROUND OF THE INVENTION

1. Field of the Invention

Regarding a three-dimensional display device, a three-dimensional display method, and a program, the present invention relates to a three-dimensional display device that displays a three-dimensional model of a structure, a three-dimensional display method, and a program.

2. Description of the Related Art

Since the structure may be damaged due to aging or the like, inspection work is periodically or irregularly performed. Since the inspection work requires a lot of manpower, it is considered to support an inspector in various forms.

For example, JP2019-57192A describes a structure inspection support system that analyzes a deterioration state of a structure, creates a plan for inspection and repair of the structure, and visualizes a plan for a user.

SUMMARY OF THE INVENTION

In a case where a damage is found during the inspection work, a cause of the found damage may be inferred. By inferring the cause of the damage, it is possible to appropriately evaluate a soundness of the structure and determine a repair method.

Here, a large amount of information and a large amount of work are necessary for the work of specifying the cause of the damage. For example, in a case where the cause of the damage may be another damage, an inspector has to specify an event (damage) which is the cause in consideration of a positional relationship by using a plurality of two-dimensional damage diagrams and a design drawing of the structure.

Further, for example, in a case where the cause of the damage is the surrounding environment or the like, the inspector has to obtain necessary information such as weather, temperature, humidity, and traffic volume to specify the cause.

Furthermore, it is necessary for the inspection manager to confirm a large amount of materials in a case of confirming the inspection result. Consequently, the manager is confused as to which material should be confirmed regarding the cause of the damage, and it takes time for the search or the like, and it is difficult to perform the work efficiently. As described above, JP2019-57192A does not mention a method of easily knowing the cause of damage.

The present invention has been made in view of such circumstances, and an object of the present invention is to provide a three-dimensional display device, a three-dimensional display method, and a program capable of notifying a user of an event having a causal relationship with a damage.

In order to achieve the above-mentioned object, according to an aspect of the present invention, there is provided a three-dimensional display device comprising: a memory that stores a three-dimensional model of a structure, a damage displayed in the three-dimensional model, and an event that has a causal relationship with the damage; a display unit; and a processor. The processor causes the display unit to display the three-dimensional model, superimpose the damage on the three-dimensional model and display the damage, and display the event having the causal relationship with the damage.

According to the aspect, the event having a causal relationship with the damage on the three-dimensional model is displayed on the display unit. Therefore, the user can be notified of the event having the causal relationship with the damage.

It is preferable that the processor performs notification display for giving a notification that the damage and the event have the causal relationship.

It is preferable that the processor performs the notification display in a color for displaying the damage and the event.

It is preferable that the processor performs the notification display by displaying a marker.

It is preferable that the processor performs the notification display by displaying the damage and the event side by side.

It is preferable that the processor displays two-dimensional information relating to at least one of the damage or the event.

It is preferable that the processor displays the event, which has a rank determined in accordance with a strength of the causal relationship, by changing a display form in accordance with the rank.

It is preferable that the event has a rank determined in accordance with a positional relationship with the damage.

It is preferable that the event has a rank determined in accordance with a degree of effect of the damage.

It is preferable that the processor displays the damage and the event in chronological order.

It is preferable that the event is composed of at least one of structure data, environment data, damage data, or repair history data.

It is preferable that the processor displays the event having the causal relationship with respect to the damage which is selected.

According to another aspect of the present invention, there is provided a three-dimensional display method using a three-dimensional display device including a memory that stores a three-dimensional model of a structure, a damage displayed in the three-dimensional model, and an event that has a causal relationship with the damage, a display unit, and a processor. The three-dimensional display method causes the processor to execute: a step of displaying the three-dimensional model on the display unit; a step of superimposing the damage on the three-dimensional model and displaying the damage on the display unit; and a step of displaying the event, which has a causal relationship with the damage, on the display unit.

According to another aspect of the present invention, there is provided a program for executing the three-dimensional display method using a three-dimensional display device including a memory that stores a three-dimensional model of a structure, a damage displayed in the three-dimensional model, and an event that has a causal relationship with the damage, a display unit, and a processor. The program causes the processor to execute the three-dimensional display method comprising: a step of displaying the three-dimensional model on the display unit; a step of superimposing the damage on the three-dimensional model and displaying the damage on the display unit; and a step of displaying the event, which has a causal relationship with the damage, on the display unit.

According to the present invention, the event having a causal relationship with the damage on the three-dimensional model is displayed on the display unit. Therefore, the user can be notified of the event having the causal relationship with the damage.

BRIEF DESCRIPTION OF THE DRAWINGS

FIG. 1 is a block diagram showing an example of a hardware configuration of a three-dimensional display device.

FIG. 2 is a block diagram showing a configuration example of functions implemented by a CPU.

FIG. 3 is a flow chart showing a three-dimensional display method using the three-dimensional display device.

FIG. 4 is a diagram showing a part of a configuration example of storage of data stored in a memory.

FIGS. 6A and 6B are diagrams showing an example of display on a display unit of an event having a causal relationship with a damage.

FIGS. 7A and 7B are diagrams showing an example of display on a display unit of an event having a causal relationship with a damage.

FIGS. 8A and 8B are diagrams showing an example of display on a display unit of an event having a causal relationship with a damage.

FIG. 10 is a diagram showing a part of a configuration example of storage of data stored in a memory.

FIG. 14 is a diagram showing a configuration example of storage of data stored in a memory.

FIG. 15 is a diagram showing an example of display on a display unit of an event having a causal relationship with a damage.

FIG. 16 is a diagram showing an example of display on a display unit of an event having a causal relationship with a damage.

DESCRIPTION OF THE PREFERRED EMBODIMENTS

Figure 5:
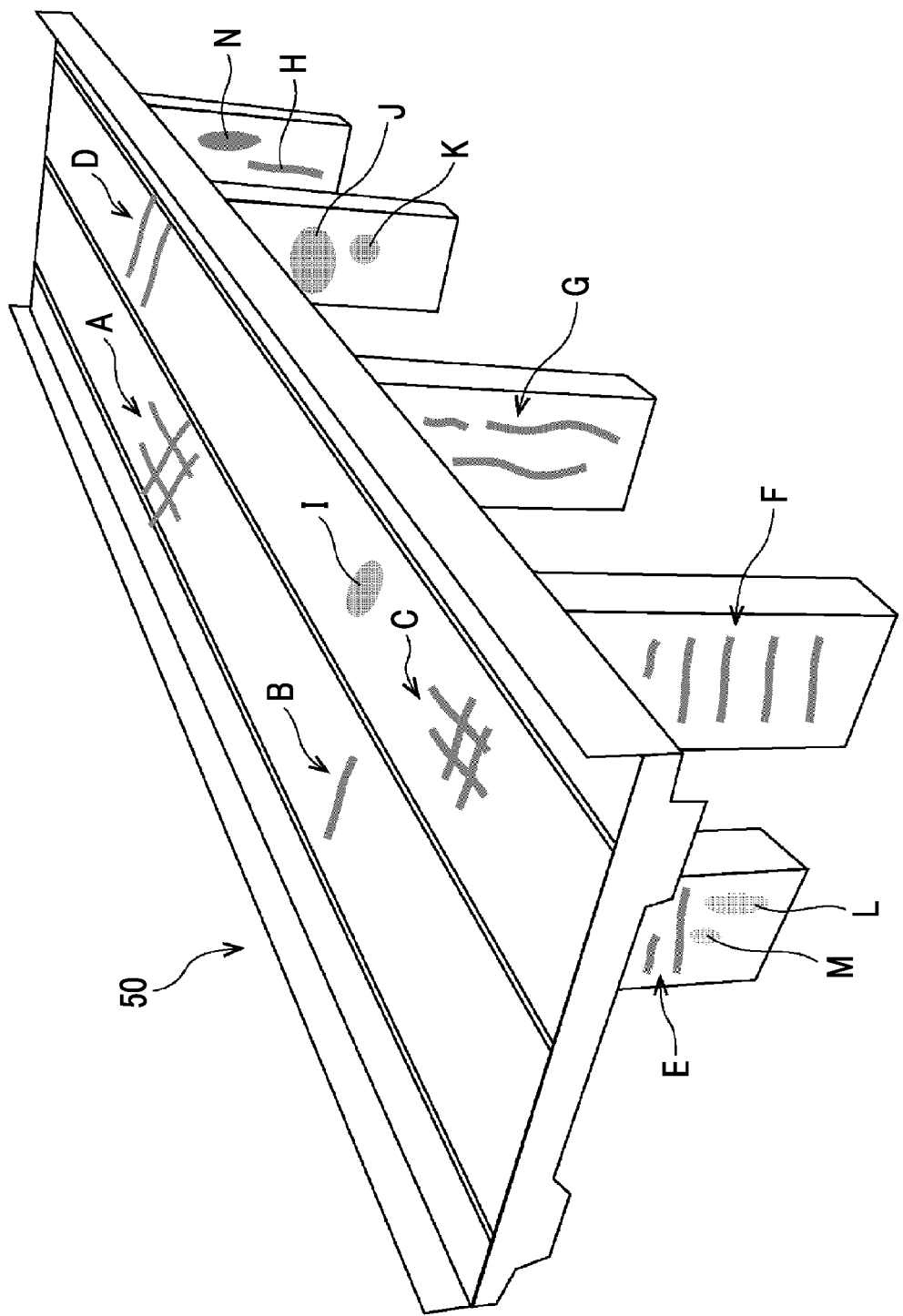
FIG. 5 is a diagram showing a three-dimensional model of a part of a bridge A.

Embodiments of a three-dimensional display device, a three-dimensional display method, and a program according to the present invention will be hereinafter described with reference to the accompanying drawings.

FIG. 1 is a block diagram showing an example of a hardware configuration of a three-dimensional display device 10.

As the three-dimensional display device 10, it is possible to use a personal computer or a workstation. The hardware configuration of the three-dimensional display device 10 is mainly composed of a data acquisition unit 12, a memory 16, an operating part 18, a central processing unit (CPU) 20, a random access memory (RAM) 22, a read only memory (ROM) 24, and a display unit (monitor) 26.

The data acquisition unit 12 is an external data input unit, and acquires, for example, information (data) stored in the memory 16. It should be noted that the information, which is stored in the memory 16, may be acquired by the data acquisition unit 12 or may be stored in the memory 16 in advance.

The memory 16 functions as a database and stores data for display performed by the three-dimensional display device 10. For example, the memory 16 stores a three-dimensional model of a structure, a damage displayed on the three-dimensional model, and an event having a causal relationship with a damage. In addition, the structure of the three-dimensional model is, for example, a structure of social infrastructure such as a building, a bridge, or a tunnel. Further, the damage superimposed and displayed on the three-dimensional model is the damage generated in a target structure of the three-dimensional model, and is a damage model imitating the damage. The types of damage which are displayed on the three-dimensional model are crack, peeling, reinforcing bar exposure, water leakage, free lime, and corrosion. Furthermore, an event having a causal relationship with the damage is an event that causes the damage or an event that occurs due to the damage.

The event is composed of at least one of structure data, environment data, damage data, or repair history data. The structure data is, for example, data relating to a type of structure or a constitution of concrete. Specifically, in a case of a bridge, the type of structure is a slab bridge, a girder bridge, an arch bridge, a truss bridge, or the like. Further, a specific type of structure in the case of a tunnel is a mountain tunnel, an excavation tunnel, a shield tunnel, or the like. Furthermore, the configuration of the concrete is information about the presence or absence of the reinforcing bar or the component of the concrete. Specifically, the presence or absence of the reinforcing bar is information about the arrangement of the reinforced concrete, the prestressed concrete, the unreinforced concrete, and the reinforcing bar. In addition, specifically, components of the concrete include the type of aggregate and the water-cement ratio.

The environment data is meteorological data, earthquake information, traffic volume data, or positional information. Specifically, the meteorological data includes weather, temperature, humidity, amount of incoming salt, and the like. Further, specifically, the earthquake information is the earthquake intensity of the region where the structure is located. Specifically, the traffic volume data includes a traffic volume of a car, a traffic volume of a large vehicle, and the like. Furthermore, specifically, the positional information includes a distance of the structure from the sea, an altitude of a place where the structure is located, and the like.

Further, the damage data is, for example, information about a type of damage. Specifically, the type of damage is crack, peeling, reinforcing bar exposure, water leakage, free lime, corrosion, and the like.

Further, the repair history data is information relating to the type of repair. Specifically, the types of repair include crack injection work, cross-section repair work, and repainting.

Further, the following can be considered as specific examples of the causal relationship.

Due to road surface crack, at least one of floor board crack, peeling, reinforcing bar exposure, water leakage, or free lime occurs as a result. As a mechanism of the causal relationship, water permeates through road surface crack, and the concrete deteriorates. Then, a damage occurs on the lower surface of the floor board.

Further, as another example, due to crack, at least one of water leakage or free lime occurs as a result. In the mechanism of the causal relationship, water infiltrating from a crack reacts with the lime content inside the concrete and appears as free lime.

Further, as another example, corrosion occurs as a result due to an amount of incoming salt. In the mechanism of the causal relationship, the oxide film of the steel member is destroyed by the salt content, and the steel member is liable to be eroded.

Further, as another example, road surface cracks and floor board cracks occur as a result of a large amount of traffic volume of large vehicles. In the mechanism of the causal relationship, a load due to the running of a large vehicle repeatedly acts to generate cracks.

Further, as another example, at least one of cracks, water leakage, free lime, or corrosion occurs as a result due to a defect in a repair work. With such a mechanism, in a case where there is a defect in the repair work, some damage occurs from the vicinity of the repaired part.

As described above, the damages and the events have various causal relationships, and the events may occur due to the damages or the damages may occur due to the events. The causal relationship between the damage and the event is not limited to the specific example of the causal relationship described above.

Next, a method of associating the damages and the events having causal relationships will be described. Association between the damages and the events having the causal relationships is performed by various methods as described below.

In a case where an event having a causal relationship is a damage, there may be a positional relationship between the damage and the damage and then association therebetween can be performed. For example, in a case where there may be a causal relationship between damage to the road surface and damage to the floor board on the opposite side thereof, the association therebetween can be performed. Further, for example, in a case where the crack and the water leakage and/or the free lime in the vicinity thereof have a causal relationship, association therebetween can be performed.

Further, the user may associate the damage with the event in a case where the damage and the event have a causal relationship. Specifically, in a case where an event has a causal relationship with a damage revealed by the user through the inspection work, association therebetween can be performed.

Further, in a specific method of performing the association, the damage and the event having the causal relationship are associated with each other by manual operation of a user, image processing, or a detector configured by the artificial intelligence (AI). It should be noted that the detector configured by AI is a detector obtained by machine-learning a rule of associating the damage having the causal relationship with the event.

The operating part 18 is composed of a pointing device such as a keyboard or a mouse. The user inputs a command to the three-dimensional display device 10 through the operating part 18.

The central processing unit (CPU) (processor) 20 implements each function by executing a program stored in the memory 16 or the ROM 24.

FIG. 2 is a block diagram showing a configuration example of functions implemented by the CPU 20.

The CPU 20 includes a three-dimensional model display unit 30, a damage display unit 32, an operation receiving unit 34, and an event display unit 36.

FIG. 3 is a flow chart showing a three-dimensional display method (including a program for causing the three-dimensional display device 10 to perform the three-dimensional display method) using the three-dimensional display device 10.

First, the three-dimensional model display unit 30 displays the three-dimensional model which is stored in the memory 16 on the display unit 26 (step S10). Thereafter, the damage display unit 32 superimposes and displays the damage of the target structure of the three-dimensional model on the three-dimensional model (step S11). Then, the operation receiving unit 34 receives the selection of the damage displayed on the display unit 26, which is input through the operating part 18 (step S12). After that, the event display unit 36 displays the event having the causal relationship with the selected damage on the display unit 26 (step S13).

First Embodiment

Next, the first embodiment will be described. FIG. 4 is a diagram showing a part of a configuration example of storage of data stored in the memory 16 of the present embodiment.

In the configuration example of storage shown in FIG. 4, a three-dimensional model of the bridge A is stored. Further, the damage of the bridge A is stored in association with the bridge A. In the drawing, a crack A, a crack B, and a crack C are described, and other damages are omitted. Furthermore, although not shown, the position coordinates of the bridge A of each damage on the three-dimensional model are also stored, and each damage is superimposed and displayed on the three-dimensional model.

An event 1 having a causal relationship with the crack A is a crack Z. Further, a captured image (inspection image), which is captured for each of the crack A and the crack Z, is stored. Further, an event 2 having a causal relationship with the crack A is traffic information A.

The event 1 having a causal relationship with the crack B is a crack Y. The event 1 having a causal relationship with the crack C is a crack X. It should be noted that, as described above, one or a plurality of events having causal relationships are associated with one damage.

Hereinafter, an example of display on the display unit 26 in a case where the data shown in FIG. 4 is stored in the memory 16 will be described.

(Display Example of Three-Dimensional Model of First Embodiment)

FIG. 5 is a diagram showing a three-dimensional model 50 of a part of the bridge A which is displayed on the display unit 26 by the three-dimensional model display unit 30.

A crack A, a crack B, a crack C, a crack D, and peeling I are superimposed and displayed on the road surface of the three-dimensional model 50 of the bridge A. Further, a crack E, a crack F, a crack G, a crack H, water leakage L, water leakage M, peeling K, peeling J, and rust stain N are superimposed and displayed on the bridge support of the three-dimensional model 50. By displaying the damage on the three-dimensional model 50 in such a manner, it is possible to notify the user of the position of the damage and the type of the damage.

(Display Example 1 of First Embodiment)

FIGS. 6A and 6B are diagrams showing an example of display on the display unit 26 of an event having a causal relationship with a damage. FIG. 6A shows user's selection of the crack A, and FIG. 6B shows notification display by markers (52, 54) transitioned by the user's selection.

As shown in FIG. 6A, the user selects the crack A by using the operating part 18 to move a cursor 70. The operation receiving unit 34 receives the selection of the crack A input through the cursor 70. Here, the event 1 having the causal relationship with the crack A based on the data stored in the memory 16 is the crack Z. The crack Z is located on the lower surface side of the floor board (not shown).

As shown in FIG. 6B, the event display unit 36 displays the balloon-shaped marker 52 in the vicinity of the crack A and displays the marker 54 of the same color and the same shape in the vicinity of the crack Z to display the notification.

In such a manner, by displaying the marker 52 in the vicinity of the crack A and displaying the marker 54 in the vicinity of the crack Z, notification display for clearly notifying the user that the crack A and the crack Z have a causal relationship can be displayed.

(Display Example 2 of First Embodiment)

FIGS. 7A and 7B are diagrams showing an example of display on the display unit 26 of an event having a causal relationship with a damage FIG. 7A shows the user selecting the crack A, and FIG. 7B shows notification display in a two-viewpoint view transitioned by the user selection.

As shown in FIG. 7A, the user selects the crack A by using the operating part 18 to move the cursor 70. The operation receiving unit 34 receives the selection of the crack A, which is input through the cursor 70. Further, the event 1 having a causal relationship with the crack A is the crack Z and the crack Z is located on the lower surface side of the floor board (not shown). Therefore, it is difficult to simultaneously view the crack A and the crack Z on the three-dimensional model 50.

As shown in FIG. 7B, the event display unit 36 displays the notification by displaying the crack A on the road surface side and the crack Z on the lower surface side of the floor board side by side in a two-viewpoint view.

In such a manner, by displaying the crack A on the road surface side and the crack Z on the lower surface side of the floor board side by side in the two-viewpoint view, it is possible to clearly give a notification that the crack A and the crack Z have a causal relationship. Moreover, the crack A and the crack Z can be displayed in an easy-to-see manner.

(Display Example 3 of First Embodiment)

FIGS. 8A and 8B are diagrams showing an example of display on the display unit 26 of an event having a causal relationship with a damage. FIG. 8A shows user's selection of the crack A, and FIG. 8B shows notification display transitioned by the user's selection.

As shown in FIG. 8A, the user selects the crack A by using the operating part 18 to move the cursor 70. The operation receiving unit 34 receives the selection of the crack A which is input through the operating part 18. In the example, the user inputs a command to be displayed for the event 2 through the operating part 18. The event 2 having the causal relationship with the crack A based on the data stored in the memory 16 is the traffic information A of the environment data.

As shown in FIG. 8B, the event display unit 36 displays the crack A and the traffic information A (indicated by the reference numeral 56) side by side. In such a manner, by displaying the crack A and the traffic information A (indicated by reference numeral 56) side by side, it is possible to clearly give a notification that the crack A and the traffic information A have a causal relationship.

(Display Example 4 of First Embodiment)

Figures 9A, 9B:
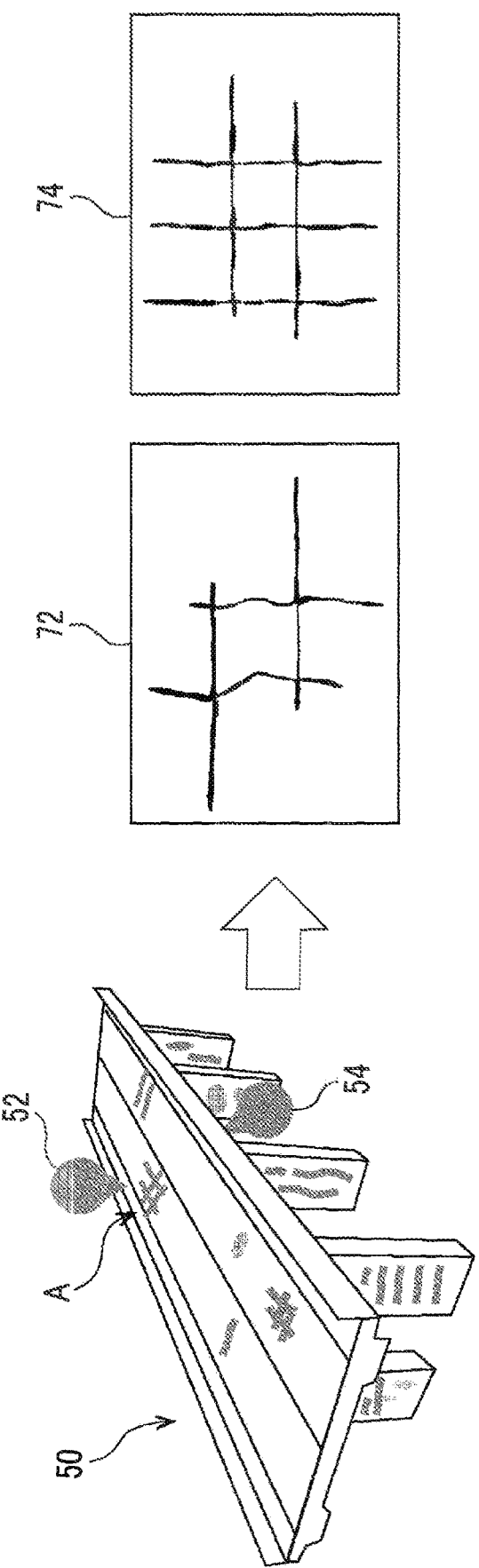
FIGS. 9A and 9B are diagrams showing an example of display on a display unit of an event having a causal relationship with a damage.

FIGS. 9A and 9B are diagrams showing an example of display on the display unit 26 of an event having a causal relationship with a damage. FIG. 9A shows the notification display of the crack A and the crack Z by the markers (52, 54). In FIG. 9B, the captured images (72, 74) of the crack A and the crack Z are displayed by inputting a command from the operating part 18 of the user.

In FIG. 9A, the marker 52 and the marker 54 are displayed for the crack A and the crack Z as shown in FIG. 6B, and the notification thereof is displayed. Then, the user inputs a command to display the captured images which are the two-dimensional information of the crack A and the crack Z through the operating part 18.

As shown in FIG. 9B, the event display unit 36 displays the captured image 72 of the crack A and the captured image 74 of the crack Z side by side on the display unit 26. In such a manner, by displaying the captured image 72 of the crack A and the captured image 74 of the crack Z on the display unit 26, the user is able to observe the actual crack with respect to the crack A and the crack Z having a causal relationship. In the above-mentioned example, the captured images (72, 74) are shown as an example of the two-dimensional information, but the example of the two-dimensional information is not limited to this. Other examples of the two-dimensional information include damage information (a type of damage, a location of damage, a size, a degree of damage), a table, and a graph. In the above-mentioned example, the two-dimensional information is displayed for each of the crack A and the crack Z, but the present invention is not limited thereto. The two-dimensional information relating to at least one of the crack A or the crack Z may be displayed.

Second Embodiment

Next, a second embodiment will be described. FIG. 10 is a diagram showing a part of a configuration example of storage of data stored in the memory 16 in the present embodiment.

In the configuration example of storage shown in FIG. 10, a three-dimensional model of a bridge B is stored. As damage to the bridge B, water leakage P, a crack O1, a crack O2, and a crack Q6 are stored. The cracks Q1 to Q5 are stored as events having causal relationships with the water leakage P. Ranks are respectively stored in the cracks Q1 to Q5 in accordance with the strength of the causal relationship of the water leakage P. The crack Q7, earthquake information A, and temperature information A are stored as events having causal relationships with the crack Q6. In each of the crack Q7, the earthquake information A, and the temperature information A, a rank is stored in accordance with a strength of the causal relationship of the crack Q6.

Here, the ranking according to the strengths of the causal relationships can be performed by various methods. For example, it is possible to perform ranking on the basis of the positional relationship between the damage and the event having a causal relationship, or to perform ranking in accordance with the degree of effect of the event having a causal relationship. The cracks Q1 to Q5 are ranked in accordance with the positional relationships (distances) with the water leakage P. For example, the same rank is attached to the cracks located within a threshold value (distance from the water leakage P) which is set in each rank. Specifically, a rank of level 10 is given to the cracks Q5 and the cracks Q4, a rank of level 7 is given to the cracks Q3, a rank of level 3 is given to the crack Q2, and a rank of level 1 is given to the crack Q1.

The crack Q7, the earthquake information A, and the temperature information A are ranked as "large", "medium", and "small" in descending order of the degree of effect on the crack Q6. The degree of effect is a magnitude of the impact that causes the crack, and for example, the degree of effect is determined in advance in each event. It should be noted that the ranking may be performed by a method by a user, or may be performed by a recognizer including image processing and AI.

Hereinafter, an example of display on the display unit 26 in a case where the data shown in FIG. 10 is stored in the memory 16 will be described.

(Display Example 1 of Second Embodiment)

Figure 11A:
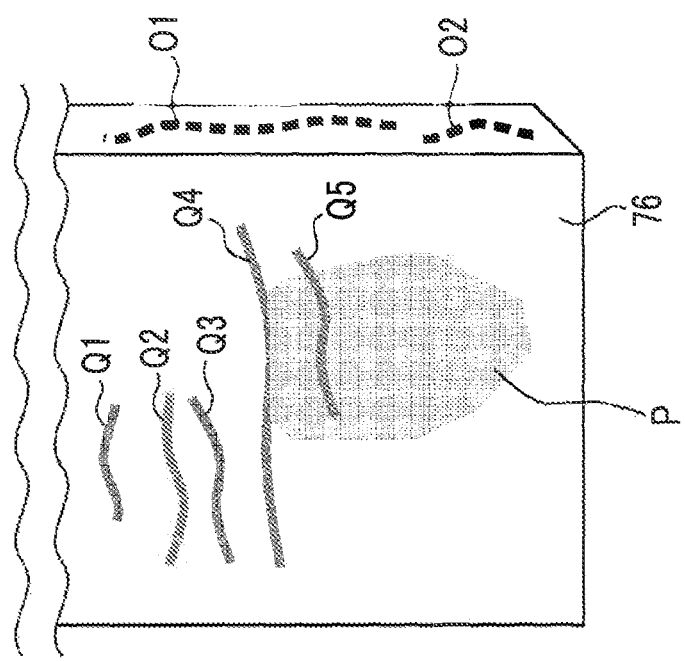
FIGS. 11A and 11B are diagrams showing an example of display on a display unit of an event having a causal relationship with a damage.
Figure 11B:
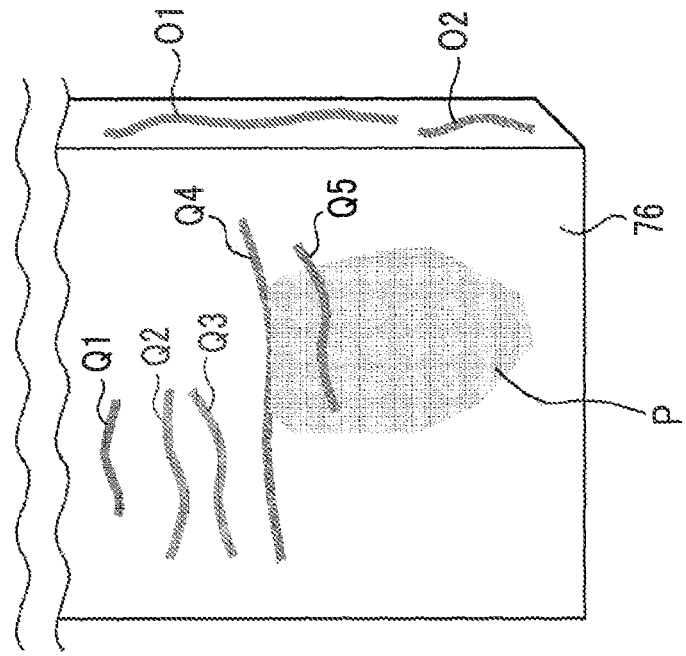

FIGS. 11A and 11B are diagrams showing an example of display on the display unit 26 of an event having a causal relationship with a damage. FIG. 11A shows a three-dimensional model 76 of a part of the bridge support of the bridge B, and FIG. 11B shows notification display in colors to be displayed.

As shown in FIG. 11A, in the three-dimensional model 76, the water leakage P, the cracks Q1 to Q5, the crack O1, and the crack O2 are shown. The user selects the water leakage P through the operating part 18. The operation receiving unit 34 receives selection of the water leakage P. Here, the events having causal relationships with the water leakage P on the basis of the data stored in the memory 16 are the cracks Q1 to Q5.

As shown in FIG. 11B, the event display unit 36 displays the water leakage P and the cracks Q1 to Q5 having causal relationships in the same color, for example, red. Further, the crack O1 and the crack O2 having no causal relationship are displayed in a color different from the cracks Q1 to Q5 and the water leakage P, for example, black.

In such a manner, by displaying the water leakage P and the cracks Q1 to Q5 having causal relationships in the same color, it is possible to clearly notify the user that the water leakage P and the cracks Q1 to Q5 have causal relationships.

(Display Example 2 of Second Embodiment)

Figure 12B:
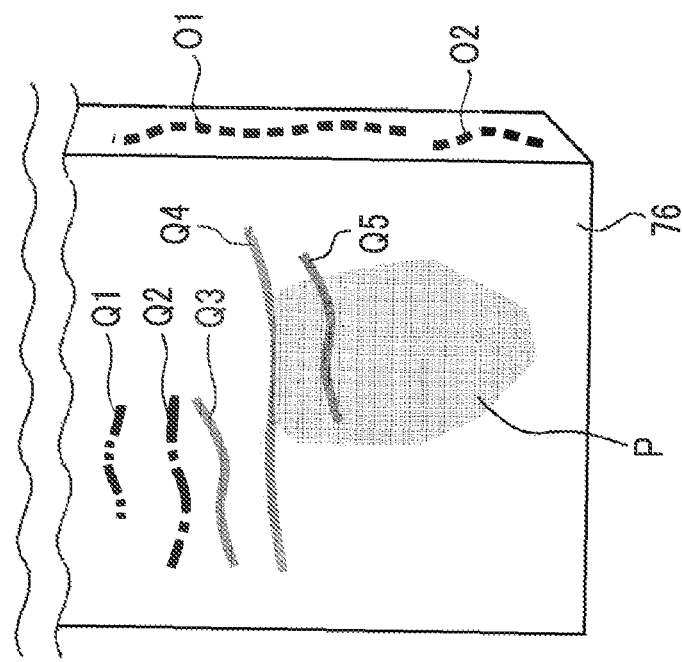
FIGS. 12A and 12B are diagrams showing an example of display on a display unit of an event having a causal relationship with a damage.
Figure 12A:
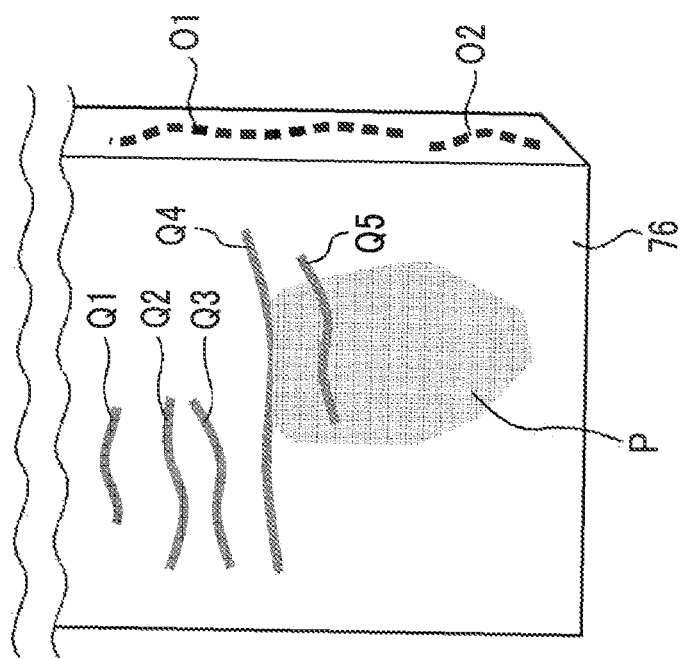

FIGS. 12A and 12B are diagrams showing an example of display on the display unit 26 of an event having a causal relationship with a damage. FIG. 12A shows notification display performed by displaying the water leakage P and the cracks Q1 to Q5 in the same color, and FIG. 12B shows a case where the ranks of the cracks Q1 to Q5 are displayed.

In FIG. 12A, the water leakage P and the cracks Q1 to Q5 are displayed in the same color (for example, red), and notification thereof is displayed. The user inputs, through the operating part 18, a command for performing a display mode such that the ranks of the cracks Q1 to Q5 are known.

In FIG. 12B, the displayed colors are sequentially changed in accordance with the ranking such that the damage having the highest rank is displayed in red and the damage having the lowest rank is displayed in blue. Specifically, the crack Q4 and the crack Q5 are displayed in the same red, and the crack Q3, the crack Q2, and the crack Q1 are sequentially displayed to change to blue.

In such a manner, by changing the display color in accordance with the ranking, the user is able to easily know that the water leakage P and the cracks Q1 to Q5 have causal relationships, and is able to know the degree of effect on the water leakage P and the positional relationship. In the above description, display is performed by changing the display form in which the display color is changed in accordance with the ranking, but the present invention is not limited thereto. Other examples can be adopted as long as the display form is capable of notifying the user of the ranking.

(Display Example 3 of Second Embodiment)

Figure 13:
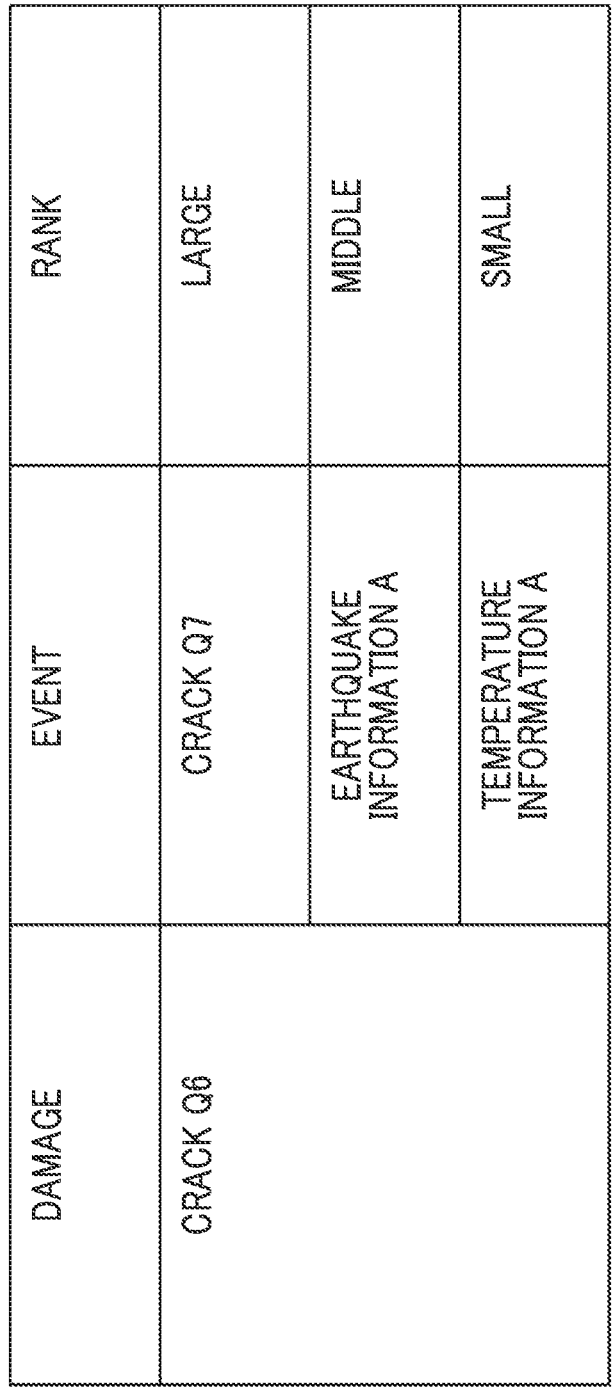
FIG. 13 is a diagram showing a table showing a damage, events having causal relationships, and ranks attached to the events.

FIG. 13 is a diagram showing a table 80 which is displayed on the display unit 26 by the event display unit 36 and which has a damage, events having causal relationships, and ranks attached to the events.

As shown in FIG. 13, the event display unit 36 displays the table 80 including the crack Q7, the earthquake information A, and the temperature information A, which are events having causal relationships with the crack Q6, on the display unit 26. Further, in Table 80, the crack Q7 has a degree of effect of "large", the earthquake information A has a degree of effect of "medium", and the temperature information A has a degree of effect of "small".

In such a manner, by displaying Table 80 on the display unit 26, it is possible to clearly notify the user that the crack Q6, the crack Q7, the earthquake information A, and the temperature information A have causal relationships. In addition, the degree of effect of the crack Q7, the earthquake information A, and the temperature information A on the crack Q6 can be notified.

Third Embodiment

Next, a third embodiment will be described. FIG. 14 is a diagram showing a configuration example of storage of data stored in the memory 16 in the present embodiment.

In the configuration example of storage shown in FIG. 14, a three-dimensional model of a bridge C is stored. Further, as damage to the bridge C, the crack A generated in the floor board was found through an inspection on May 31, 2010, and was stored together with the date. Further, as the damage of the bridge C, the growth of the crack A was confirmed through an inspection on May 31, 2015, and was stored together with the date. The traffic information A was associated therewith and stored as the event 1 having a causal relationship (occurrence cause) with the crack A inspected on May 31, 2010. Further, the crack B generated on the road surface was associated therewith and was additionally stored as the event 2 having a causal relationship (growth cause) with the crack A inspected on May 31, 2015.

Hereinafter, a display example on the display unit 26 in a case where the data shown in FIG. 14 is stored in the memory 16 will be described.

(Display Example 1 of Third Embodiment)

FIG. 15 and FIG. 16 are diagrams showing an example of display on the display unit 26 of an event having a causal relationship with a damage. FIG. 15 is a diagram showing an event (traffic information A) having a causal relationship with the crack A which is inspected on May 31, 2010. FIG. 16 is a diagram showing an event (crack B) having a causal relationship with the crack A which is inspected on May 31, 2015.

In the case shown in FIG. 15, a scroll bar 62 is displayed, and the scroll bar 62 is moved. Thereby, cracks or events having causal relationships can be displayed in chronological order. The scroll bar 62 is set to display the data of May 31, 2010, and the event display unit 36 displays the crack A and the traffic information B (indicated by the reference numeral 60) side by side on the display unit 26. Thereby, it is possible to notify the user of the crack A that has occurred and the traffic information A that is the cause of the crack A.

In the case shown in FIG. 16, the scroll bar 62 is set to display the data of May 31, 2015, and the event display unit 36 displays the crack A and the crack B side by side on the display unit 26. As for the crack A displayed in FIG. 16, the cracks have grown from the cracks detected on May 31, 2010. Further, the crack B, which is the cause of the growth of the crack A, is displayed side by side. Thereby, it is possible to notify the user of the grown crack A and the crack B that is the cause of the growth. In addition, although the description has been described with reference to separate drawings in FIGS. 15 and 16, the display unit 26 of two screens may display the cracks at the same time.

<Others>

In the above-mentioned embodiment, the hardware structures of the processing unit (the three-dimensional model display unit 30, the damage display unit 32, the operation receiving unit 34, and the event display unit 36) that executes various types of processing are various processors described as follows. The various processors include: a central processing unit (CPU) as a general-purpose processor which functions as various processing units by executing software (programs); a programmable logic device (PLD) as a processor capable of changing a circuit configuration after manufacturing a field programmable gate array (FPGA); a dedicated electrical circuit as a processor, which has a circuit configuration specifically designed to execute specific processing, such as an application specific integrated circuit (ASIC); and the like.

One processing unit may be composed of one of these various types of processors, or may be composed of two or more processors of the same type or different types (for example, a plurality of FPGAs or a combination of a CPU and an FPGA). Further, the plurality of processing units may be composed of one processor. As an example of the plurality of processing units composed of one processor, first, as represented by computers such as a client and a server, there is a form in which one processor is composed of a combination of one or more CPUs and software and this processor functions as a plurality of processing units. Second, as represented by a system on chip (SoC), there is a form in which a processor that realizes the functions of the whole system including a plurality of processing units with a single integrated circuit (IC) chip is used. As described above, the various processing units are configured by using one or more of the various processors as a hardware structure.

Further, the hardware structure of these various processors is more specifically an electric circuit (circuitry) in which circuit elements such as semiconductor elements are combined.

Each of the above-mentioned configurations and functions can be appropriately implemented by any hardware, software, or a combination of both. For example, it is also possible to apply the present invention to a program that causes a computer to execute the above-mentioned processing step (processing procedure), a computer-readable storage medium (non-transitory storage medium) on which such a program is recorded, or a computer on which such a program can be installed.

Although the examples of the present invention have been described above, it is needless to say that the present invention is not limited to the above-mentioned embodiment. Thus, various modifications can be made without departing from the spirit of the present invention.

EXPLANATION OF REFERENCES

10: three-dimensional display device
12: data acquisition unit
16: memory
18: operating part
20: CPU
24: ROM
26: display unit
30: three-dimensional model display unit
32: damage display unit
34: operation receiving unit
36: event display unit

What is claimed is:

1. A three-dimensional display device comprising:
 a memory that stores a three-dimensional model of a structure, a plurality of damages displayed in the three-dimensional model, and a damage that has a causal relationship with at least one of the plurality of the damages;
 a display unit; and
 a processor,
 wherein the processor causes the display unit to:
  display the three-dimensional model,
  superimpose the plurality of damages on the three-dimensional model and display the plurality of damages, and
  display the damage having the causal relationship with at least one of the plurality of the damages, and
 wherein the processor performs notification display for giving a notification of the causal relationship.

2. The three-dimensional display device according to claim 1,
 wherein the processor performs notification display for giving a notification that the plurality of the damages and the damage have the causal relationship.

3. The three-dimensional display device according to claim 2,
 wherein the processor performs the notification display in a color for displaying the plurality of the damages and the damage.

4. The three-dimensional display device according to claim 2,
 wherein the processor performs the notification display by displaying a marker.

5. The three-dimensional display device according to claim 2,
 wherein the processor performs the notification display by displaying the plurality of the damages and the damage side by side.

6. The three-dimensional display device according to claim 1,
 wherein the processor displays two-dimensional information relating to at least one of the plurality of the damages or the damage.

7. The three-dimensional display device according to claim 1,
 wherein the processor displays the damage, which has a rank determined in accordance with a strength of the causal relationship, by changing a display form in accordance with the rank.

8. The three-dimensional display device according to claim 7,
wherein the damage has a rank determined in accordance with a positional relationship with the plurality of the damages.

9. The three-dimensional display device according to claim 7,
wherein the damage has a rank determined in accordance with a degree of effect of the plurality of the damages.

10. The three-dimensional display device according to claim 1,
wherein the processor displays the plurality of the damages and the damage in chronological order.

11. The three-dimensional display device according to claim 1,
wherein the damage is composed of at least one of structure data, environment data, damage data, or repair history data.

12. The three-dimensional display device according to claim 1,
wherein the processor displays the damage having the causal relationship with respect to the plurality of the damages which is selected.

13. A three-dimensional display method using a three-dimensional display device including a memory that stores a three-dimensional model of a structure, a plurality of damages displayed in the three-dimensional model, and a damage that has a causal relationship with at least one of the plurality of the damages, a display unit, and a processor, the three-dimensional display method comprising instructions for causing the processor to execute:
 a step of displaying the three-dimensional model on the display unit;
 a step of superimposing the plurality of damages on the three-dimensional model and displaying the plurality of damages on the display unit; and
 a step of displaying the damage, which has a causal relationship with at least one of the plurality of the damages, on the display unit, and
wherein the method further comprises instructions for causing the processor to execute a step of performing notification display for giving a notification of the causal relationship.

14. A non-transitory, computer-readable tangible storage medium which stores a program for causing, when read by a computer, the computer to perform the three-dimensional display method according to claim 13.

* * * * *